(12) United States Patent
Harrison et al.

(10) Patent No.: US 8,593,293 B2
(45) Date of Patent: Nov. 26, 2013

(54) TENSION INDICATOR

(75) Inventors: Ian Harrison, Momouthshire (GB); Michael R. Hudswell, Oxton (GB)

(73) Assignee: Inneva Ltd., Derby, Derbyshire (GB)

( * ) Notice: Subject to any disclaimer, the term of this patent is extended or adjusted under 35 U.S.C. 154(b) by 752 days.

(21) Appl. No.: 12/299,236

(22) PCT Filed: May 8, 2007

(86) PCT No.: PCT/GB2007/001673
§ 371 (c)(1),
(2), (4) Date: Nov. 11, 2010

(87) PCT Pub. No.: WO2007/129079
PCT Pub. Date: Nov. 15, 2007

(65) Prior Publication Data
US 2011/0109467 A1 May 12, 2011

(30) Foreign Application Priority Data

May 5, 2006 (GB) .................................. 0608994.0
Nov. 23, 2006 (GB) .................................. 0623344.9

(51) Int. Cl.
*G08B 21/00* (2006.01)

(52) U.S. Cl.
USPC ......................................... 340/668; 180/273

(58) Field of Classification Search
USPC ............ 340/668, 573.1; 180/273; 73/862.391
See application file for complete search history.

(56) References Cited

U.S. PATENT DOCUMENTS

| 7,048,085 | B2 * | 5/2006 | Lichtinger et al. ............ 180/273 |
| 7,231,693 | B2 | 6/2007 | Wilcox et al. |
| 7,319,400 | B2 * | 1/2008 | Smith et al. ................ 340/573.1 |
| 7,475,490 | B2 | 1/2009 | Sawall et al. |
| 7,509,711 | B2 | 3/2009 | Hsieh |
| 7,849,906 | B2 | 12/2010 | Kraeutler |
| 7,967,735 | B2 | 6/2011 | Hudswell et al. |
| 2004/0011277 | A1 | 1/2004 | Barnes |
| 2005/0006934 | A1 | 1/2005 | Rabeony |
| 2005/0040960 | A1 | 2/2005 | Knox |

FOREIGN PATENT DOCUMENTS

| WO | 2006059114 A1 | 6/2006 |
| WO | WO-2007/129079 A1 | 11/2007 |

OTHER PUBLICATIONS

International Search Report and Written Opinion for International Application No. PCT/GB2007/001673, mailed Sep. 6, 2007; 10 pages.
"Child Seat Tension Monitor"; Research Disclosure, Mason Publications, Hampshire; GB, No. 390; Oct. 1996; 1 page; XP000639907; ISSN: 0374-4353 the whole document.
International Preliminary Report on Patentability from International Application No. PCT/GB2007/001673, mailed Aug. 22, 2008.

* cited by examiner

*Primary Examiner* — John A Tweel, Jr.
(74) *Attorney, Agent, or Firm* — Alston & Bird LLP

(57) ABSTRACT

The present invention concerns a tension indicator for indicating when a strap (2) has reached a predetermined tension level, comprising an audible signal producing member (7) having an abutment surface for engagement with said strap, said audible signal producing member altering its physical configuration in reaction to tension in said strap reaching a predetermined value, wherein the change in physical configuration creates an audible signal.

20 Claims, 4 Drawing Sheets

Acoustic Signal
(Time Domain)

FFT Analysis
(Frequency Domain)

TENSION INDICATOR

This is a national phase application of International Application PCT/GB07/01673, filed May 8, 2007, and claims priority to United Kingdom Patent Application No. 0623344.9 filed Nov. 23, 2006 and United Kingdom Patent Application No. 0608994.0 filed May 5, 2006. The present invention concerns a tension indicator and, in particular, a belt tension indicator for use with vehicle safety belts, harness straps, luggage straps and other belts or straps for securing items.

In this connection, in many applications belts and child seat harness straps are used to secure people and other items in place. In many cases, in order to properly secure an item it is important that the belt or strap is tightened to a required level, since the strap or belt being too loose may cause it not function properly. For example, child seat harness belts are commonly used to secure a child within a safety seat. However, this relies on the subjective judgment of the parent to, determine how much the belt should be tensioned. Under extreme circumstances, this could result in malfunction of the child safety seat due to incorrect tensioning. A similar situation arises in a variety of other applications. For example, harnesses for use in motor-sport, aviation or extreme sports, all rely on being tightened to a sufficient level. A user may choose to wear their harness loosely in order to improve comfort, for instance, without realising that this may compromise their safety.

To address this problem various devices have been proposed that provide an indication when a strap or belt has reached the required tension level. Most known devices involve feeding a belt through a displaced path such that, as tension in the belt increases, it tries to straighten against the resilience of a detector. US 2005 040 960 discloses one such device whereby a spring mechanism is used to counteract the tension in the belt. As the belt tension increases, a colored button or electronic detector indicates the recorded tension. However, this device is relatively complicated and requires continuous monitoring to be certain belt tension is maintained. US 2004 011 277 discloses a similar device which uses electronic circuits to operate. A problem with electronic devices is that they require a power source and more readily malfunction.

The present invention seeks to address the above problems associated with the prior art.

According to an aspect of the present invention there is provided a tension indicator for indicating when a strap has reached a predetermined tension level, comprising an audible signal producing member having an abutment surface for engagement with said strap, said audible signal producing member altering its physical configuration in reaction to tension in said strap reaching a predetermined value, wherein the change in physical configuration creates an audible signal.

In this way, a change in profile of the audible signal producing member creates an audible indication that tension in the strap has reached the required level.

The audible indication is preferably an acoustic signal audible to an operator in the vicinity of the indicator and can be used to notify a user of when a correct tension setting of the strap has been reached. Accordingly, it is possible to ensure that an apparatus, such as a child safety seat, utilizing a harness strap has been correctly fitted.

Preferably, the indicator further comprises a deflection member associated with said abutment surface, said deflection member being deflectable between a first position and a second position, wherein, when said deflection member is in said first position, said abutment surface directs said strap along an extended path, and wherein, when tension in the strap rises above the predetermined tension level, the strap acts against said abutment surface to deflect the deflection member to the second position; and wherein said deflection member produces an acoustic signal as it deflects from said first to said second position.

Conveniently, said deflection member is biased towards said first position. In this way, the tension indicator automatically resets itself when the tension in the strap or belt is reduced.

Conveniently, said deflection member is adapted to produce a second acoustic signal as it moves from said second position to said first position for indicating that the tension level has dropped below said predetermined tension level. This alerts the user that tension in the strap or belt has been reduced below the correct tension setting.

Conveniently, said deflection member is adapted to exhibit hysteresis between the first to said second positions. In this way, a minor fluctuation in tension will not automatically result in the deflection member deflecting from one position to another thereby emitting another acoustic signal. This prevents nuisance operation of the sensor device.

Conveniently, said tension indicator further comprises an adjustment means for adjusting the tension level required in the strap to deflect the deflection member from said first position to said second position. This allows a user to adjust the tension indicator, if required, depending on the particular application for which it is to be used.

Conveniently, said deflection member and said abutment surface are integrally formed.

Conveniently, the tension indicator further comprises two static abutments provided either side of the abutment surface associated with the deflection member, said static abutments for bracing said strap when the strap is under tension.

Conveniently, said deflection member is a bendable arm.

According to a further aspect of the present invention, there is provided a child safety seat comprising a tension indicator as described above.

According to a further aspect of the present invention, there is provided an aircraft seat harness comprising a tension indicator as described above.

According to a further aspect of the present invention, there is provided a vehicle seat harness comprising a tension indicator as described above.

According to a further aspect of the present invention, there is provided a racing vehicle seat harness comprising a tension indicator as described above.

According to a further aspect of the present invention, there is provided a lap seat belt comprising a tension indicator as described above.

According to a further aspect of the present invention, there is provided a tension indicator for indicating when a strap has reached a predetermined tension level, said indicator comprising:—an abutment for engagement with the strap; and a moveable member associated with said abutment, said moveable member being moveable between a first position and a second position, wherein, when said moveable member is in said first position, said abutment directs said strap along an extended path, and wherein, when tension in the strap rises above the predetermined tension level, the strap acts against said abutment to move the moveable member to the second position; and wherein said moveable member produces an acoustic signal as it moves from said first to said second position.

Examples of the present invention will now be described with reference to the accompanying drawings in which.

Figure 5A:
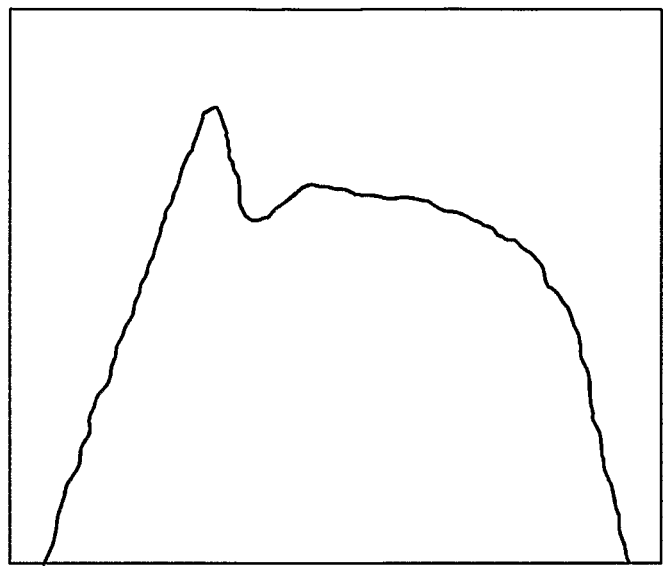
Figure 5B:
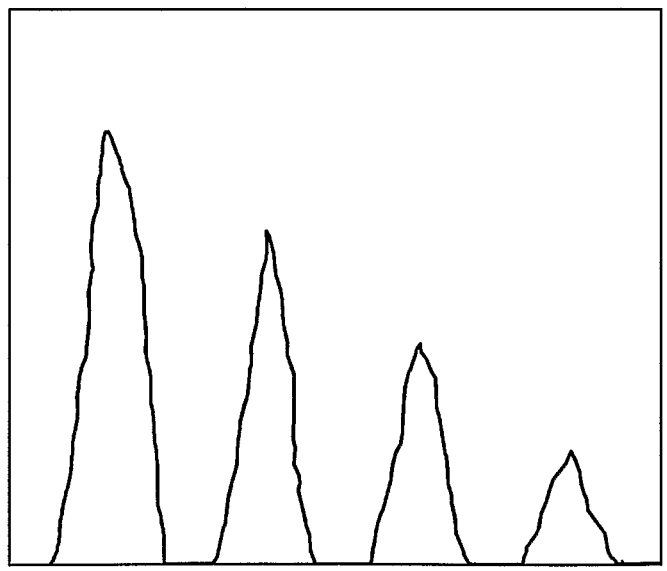
Figure 6:
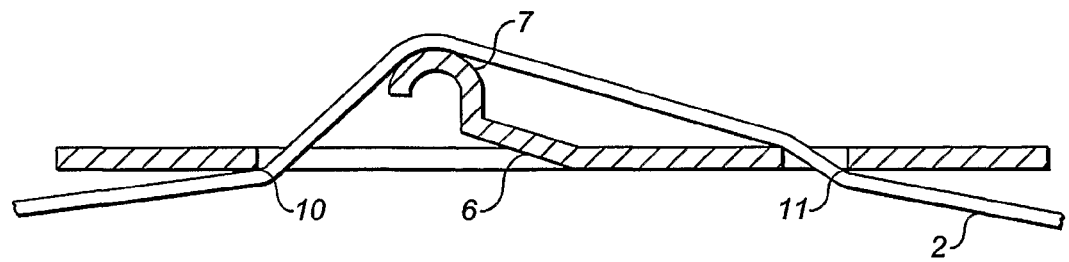
Figure 7:
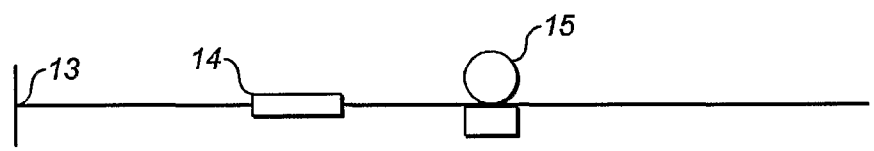
Figure 8:
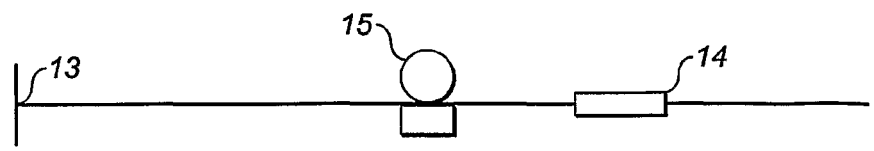

FIG. 5(a) and (b) show the time and frequency domains of an example acoustic signal produced by the present invention;

FIG. 6 shows a tension indicator according to a fourth embodiment of the present invention;

FIG. 7 shows a schematic representation of how a tension indicator according to the present invention can be located within a load path; and FIG. 8 shows a schematic representation of an alternative load path arrangement to that shown in FIG. 7.

Figure 1:
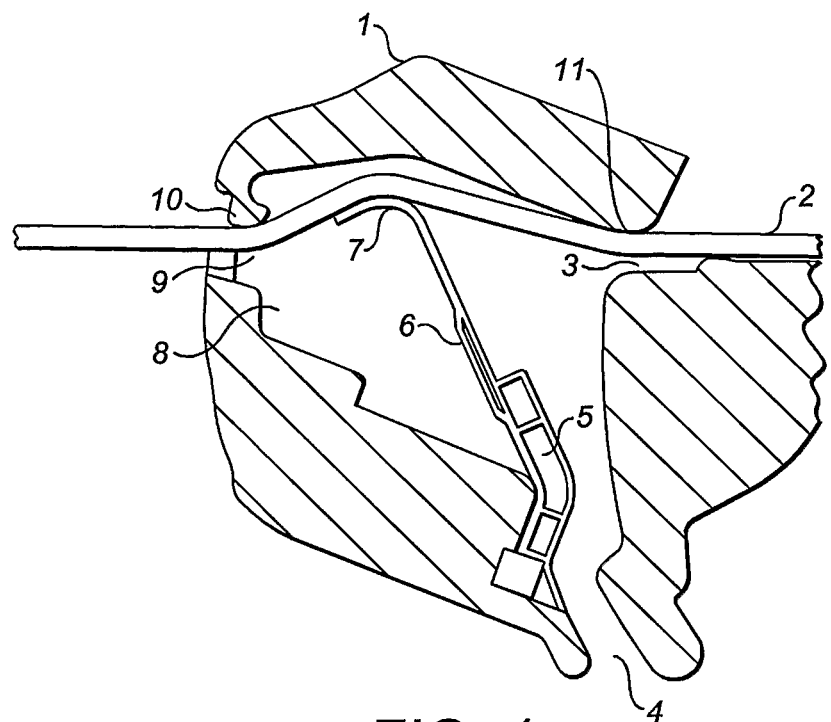
FIG. 1 shows a cross-section of a part of child safety seat incorporating a tension indicator according to a first embodiment of the present invention.
Figure 2:
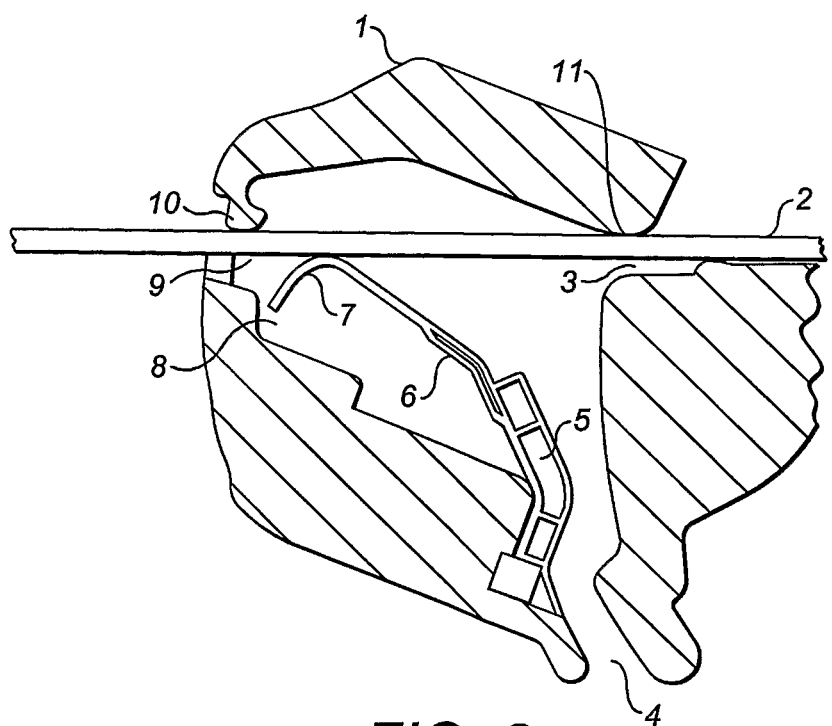
FIG. 2 shows a cross-section of the tension indicator shown in FIG. 1 when the belt is in tension.

FIGS. 1 and 2 show a first embodiment of the present invention.

In this embodiment, the tension indicator is formed integrally with the body 1 of a base of a child safety seat. For clarity, only a section of this base is illustrated in these figures. However, it will be understood that the belt 2 is associated with the harness straps for securing a child into the safety seat.

The body 1 defines a space 8 through which the belt passes. The belt 2 is guided through space 8 via two apertures 3 and 9. A clicker arm 6 is supported by the body 1 at one end by joint 5, and is provided with an abutment formation 7 at the other end which engages with the belt 2. The abutment formation 7 has a curved profile allowing the belt 2 to easily slide over it.

When the belt 2 is loose, the abutment formation 7 of clicker arm 6 diverts the belt 2 from a straight line between the apertures 3 and 9. In this way, the belt is guided along an extended path around the abutment formation 7 inside space 8. The clicker arm 6 is biased towards its position shown in FIG. 1.

When tension in the belt 2 increases, the force vector acting on the belt 2 urges the belt to move to a straightened path. In doing this, the belt 2 applies a force to the abutment formation 7 of clicker arm 6. To ensure alignment of the belt 2 as it is tensioned, it is braced at either side by static abutments 10 and 11 provided on the upper portion of body 1.

When the tension in the belt 2 exceeds a predetermined level, denoting that the belt has reached an optimum tension for a particular purpose, the resilience of the clicker arm 6 is overcome and it undergoes a transition to deflect or move to the position shown in FIG. 2, a so-called "set" position. During this transition, the clicker arm 6 is adapted to produce a sharp acoustic signal which indicates to the user that the belt has reached the desired tension; a so-called "set" acoustic signal. In this connection, the shape of space 8 in body 1 and sounding aperture 4 function to direct and amplify this acoustic signal to enable this sound to be easily heard by a user.

The acoustic signal is caused by the rapid change from one strain condition to another strain condition as the clicker arm moves between the un-set and set positions. The rapid change causes an acoustic shock wave to emanate from the clicker arm 6. The transition from one strain condition to the other, over an intermediate unstable state condition, is achieved in this embodiment by employing a clicker arm having a concave spring profile in two planes, although other configurations are also possible.

In the event that tension in the belt 2 is reduced, the bias of clicker arm 6 forces it to revert back to the position shown in FIG. 1, thereby moving the belt 2 from its shorter path back to its extended path. During this return movement, the clicker arm, 6 is adapted to produce a second sharp acoustic signal that is audibly different from the first signal. This alerts the user that tension in the belt 2 has been reduced below the optimum setting and hence provides a so-called "reset" signal.

In this connection, the clicker arm 6 is configured to exhibit hysteresis. This allows for a difference in the tension level at which the clicker arm moves to its set position, as shown in FIG. 2, and the tension level when the clicker arm 6 returns to its un-set or reset position, as shown in FIG. 1. That is, the threshold at which the clicker arm reverts back its reset position is at slightly lower level than that the level required to move it to the set position. In this sense, the clicker arm 6 is semi-stable once in its set position, and is stable in its reset position. In practice, this means that once the belt 2 has reached the required tension, a Minor reduction in tension will not automatically result in the clicker arm 6 emitting a reset signal, whereas a large reduction in tension would emit such a signal. This prevents nuisance operation of the sensor device if, for example, the belt tension is fluctuating slightly. This may occur in the case of a child safety seat if vehicle goes over a bump or the child moves their position.

Figure 3:
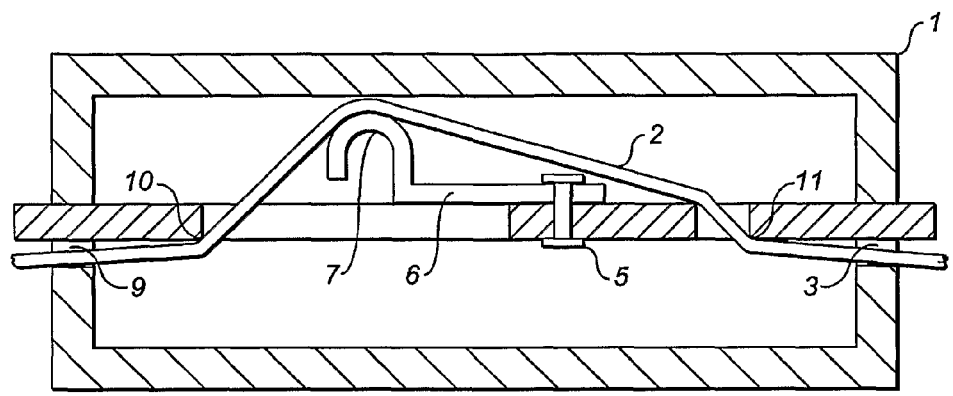
FIG. 3 shows a tension indicator according to a second embodiment of the present invention.

FIG. 3 shows a tension indicator according to a second embodiment of the present invention. In this case, the tension indicator is formed as a separate device that may be fitted to a belt or strap. The operation of the second embodiment is the same as that described above and, as such, the same reference numerals have been used for corresponding components. In this embodiment, the belt 2 is fed through pathways formed in a central portion of body 1. These pathways provide the static abutments 10 and 11 against which the belt 2 is braced when under tension and also guide the belt 2 over abutment formation 7 provided on clicker arm 6.

Figure 4:
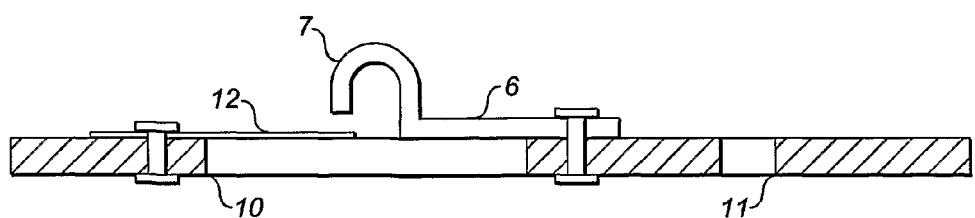
FIG. 4 shows a tension indicator according to a third embodiment of the present invention.

FIG. 4 shows a tension indicator according to a third embodiment of the present invention. This embodiment is substantially the same as that shown in FIG. 3, although in this case a vibrating reed 12 is additionally provided. When the clicker arm 6 moves to its set position, i.e. when tension in the belt is above a predetermined level, the clicker arm 6 contacts with the vibrating reed 12 to produce a more complex acoustic signal or signature. This is useful in instances where multiple tension indicators are provided since it allows different indicators to produce different sounding acoustic signals, thereby allowing a user to identify which of a number of indicators has been "set".

In this regard, different acoustic signals may also be produced by employing different clicker arm configurations or forming the clicker arms of different materials. In this connection, FIG. 5(a) and (b) show the time and frequency domains of an example acoustic signal produced by the present invention. It will be understood that employing a vibrating reed, as shown in FIG. 4, or altering the characteristics of the clicker arm, will alter the time and frequency signature of the outputted signal, thereby allowing a user or an audio monitoring device to distinguish between different sensors.

FIG. 6 shows a tension indicator according to a fourth embodiment of the present invention. The operation of this embodiment is the same as previous embodiments, however in this case, the clicker arm 6 is formed integrally with a pathway section having apertures therein for guiding the belt 2 over the abutment formation 7.

FIG. 7 shows a schematic representation of how a tension indicator 14 according to the present invention can be located within a load path. Here, the fixed end of the strap or belt is designated by numeral 13 and a locking device for maintaining the belt or strap tension is designated by numeral 15. FIG. 8 shows an alternative configuration where the device is located external to the load path of belt or strap. In these embodiments, the indicator may be provided in a cased unit, such that it can be readily added to an existing belt system.

A number of variations to the embodiments discussed above are possible. For example, in the above embodiments, the clicker arm 6 is formed of spring steel, although other materials could also be used. For example, the arm may be constructed from a number of parts such as a resilient component for providing the bias and a sound producing component for providing the acoustic signal. Moreover, instead of an arm configuration, the clicker could alternatively take the form of a moveable membrane connected to an abutment formation and adapted to emit an acoustic signal.

A second spring or the like could be also be provided in contact with the clicker arm to increase the tension force at which the clicker arm moves to its set position. An adjustment means may also be provided to adjust this second spring to thereby allow a user to adjust the force at which the transition to the set position occurs.

Means may also be provided to allow for the easy introduction of the belt or strap into the tension indicator. For example, an opening may be provided to allow for the strap or belt to be fed in laterally over the clicker. Alternatively, a moveable opening, such as a pivotable lid, may be provided to allow the strap or belt to be introduced over the clicker.

The tension indicator of the present invention may also be used in conjunction with an audio monitor able to detect the audio signal produced by the tension indicator. This allows the present to activate an electronically controlled alarm, such as a visual or audio indicator. Preferably the audio monitor subjects the signal to analysis in time and frequency domain to differentiate it from the background noise. To achieve this, the receiver can be matched to the strap tension indicator by its time and frequency domain during the manufacture to provide a unique bond between the audio monitor and the tension indicator. The audio monitor could also be configured to differentiate between different tension indicators in the same way, with the audio monitor being programmed to bond to a number of sensors within a time and frequency range. This could allow the electronically controlled alarm to provide unique alarms for independent tension indicators bonded with the receiver.

The invention claimed is:

1. A tension indicator for indicating when a strap has reached a predetermined tension level, the tension indicator comprising an audible signal producing member having an abutment surface for engagement with said strap, said audible signal producing member defining a first strain condition and a second strain condition, wherein a profile of the audible signal producing member is configured to change in reaction to tension in said strap reaching a predetermined value, and wherein the change in profile of the audible signal producing member from the first strain condition to the second strain condition produces an audible signal therefrom.

2. The tension indicator according to claim 1, further comprising:
  a deflection member associated with said abutment surface, said deflection member being deflectable between a first position and a second position,
  wherein, when said deflection member is in said first position, said abutment surface directs said strap along an extended path, and wherein, when tension in the strap rises above the predetermined tension level, the strap acts against said abutment surface to deflect the deflection member to the second position; and
  wherein said deflection member produces an acoustic signal as it deflects from said first to said second position.

3. The tension indicator according to claim 2, wherein the deflection member is biased towards said first position.

4. The tension indicator according to claim 2, wherein said deflection member is adapted to produce a second acoustic signal as it moves back from said second position to said first position for indicating that the tension level has dropped below said predetermined tension level, wherein the second acoustic signal is audibly different than the audible signal.

5. The tension indicator according to claim 2, wherein said deflection member is adapted to exhibit hysteresis between the first position and the second positions.

6. The tension indicator according to claim 2, further comprising an adjustment means for adjusting the tension level required in the strap to deflect the deflection member from said first position to said second position.

7. The tension indicator according to claim 2, wherein said deflection member and said abutment surface are integrally formed.

8. The tension indicator according to claim 2, further comprising two static abutments provided on either side of the abutment surface associated with the deflection member, wherein said static abutments are configured to brace said strap when the strap is under tension.

9. The tension indicator according to claim 2, wherein said deflection member is a bendable arm.

10. A child safety seat comprising a tension indicator according to claim 2.

11. An aircraft seat harness comprising a tension indicator according to claim 1.

12. A vehicle seat harness comprising a tension indicator according to claim 1.

13. A racing vehicle seat harness, comprising a tension indicator according to claim 1.

14. A vehicle lap belt comprising a tension indicator according to claim 1.

15. A tension indicator for indicating when a strap has reached a predetermined tension level, said indicator comprising:
  an abutment for engagement with the strap; and
  a moveable member associated with said abutment, said moveable member being deflectable between a first position and a second position,
  wherein, when said moveable member is in said first position, said abutment directs said strap along an extended path, and
  wherein, when tension in the strap rises above the predetermined tension level, the strap acts against said abutment to deflect the moveable member to the second position; and wherein said moveable member produces an acoustic signal as it deflects from said first to said second position.

16. The tension indicator of claim 15, wherein the movable member is configured to deflect from the first position to the second position over an intermediate unstable state condition, and wherein the deflection over the intermediate unstable state condition creates the acoustic signal.

17. The tension indicator of claim 1, wherein the audible signal producing member is configured to produce a second audible signal as it moves back from the second strain condition to the first strain condition for indicating that the tension in the strap has dropped below a second predetermined value, wherein the second audible signal is audibly different than the first audible signal, and wherein the second predetermined value is lower than the first predetermined value.

18. The tension indicator of claim 1, wherein the profile of the audible signal producing member is configured to change from the first strain condition to the second strain condition over an intermediate unstable state condition, and wherein the change in profile over the intermediate unstable state condition creates the audible signal.

19. A child safety seat comprising:
   a strap; and
   a tension indicator comprising an audible signal producing member having an abutment surface for engagement with the strap, said audible signal producing member defining a first strain condition and a second strain condition, wherein a profile of the audible signal producing member is configured to change in reaction to tension in the strap reaching a predetermined value, and wherein the change in profile of the audible signal producing member from the first strain condition to the second strain condition produces an audible signal therefrom.

20. The child safety seat of claim 19, wherein the profile of the audible signal producing member is configured to change from the first strain condition to the second strain condition over an intermediate unstable state condition, and wherein the change in profile over the intermediate unstable state condition creates the audible signal.

* * * * *